United States Patent [19]
Peters et al.

[11] Patent Number: 5,373,824
[45] Date of Patent: Dec. 20, 1994

[54] ACOUSTICAL DAMPING DEVICE FOR GASEOUS FUELED AUTOMOTIVE ENGINES

[75] Inventors: Edward W. Peters, Ypsilanti; Leland M. Burke, Woodhaven, both of Mich.

[73] Assignee: Ford Motor Company, Dearborn, Mich.

[21] Appl. No.: 102,930

[22] Filed: Aug. 6, 1993

[51] Int. Cl.$^5$ .............................................. F02M 21/04
[52] U.S. Cl. ........................................ 123/527; 123/456
[58] Field of Search .......... 123/525, 526, 527, 27 GE, 123/456

[56] References Cited

U.S. PATENT DOCUMENTS

| | | | |
|---|---|---|---|
| 4,274,368 | 6/1981 | Shaffer | 123/52 M |
| 4,425,897 | 1/1984 | Irvoas | 123/527 |
| 4,619,226 | 10/1986 | Ueda et al. | 123/52 MB |
| 4,646,689 | 3/1987 | Katsumoto et al. | 123/52 MB |
| 4,765,286 | 8/1988 | Lyjak et al. | 123/52 MB |
| 4,858,583 | 8/1989 | Sonntag | 123/527 |
| 5,129,368 | 7/1992 | Kristl et al. | 123/52 MB |
| 5,168,855 | 12/1992 | Stone | 123/456 |
| 5,293,856 | 3/1994 | Press et al. | 123/527 |

FOREIGN PATENT DOCUMENTS

0019529 11/1980 European Pat. Off. ............ 123/456

*Primary Examiner*—Willis R. Wolfe
*Assistant Examiner*—Erick Solis
*Attorney, Agent, or Firm*—David B. Kelley; Roger L. May

[57] ABSTRACT

A fuel supply system for a gaseous fueled automotive engine has means for damping pressure waves occurring within the fuel line between the fuel tank and the engine. In a preferred embodiment, acoustical barriers, such as annular rings, are secured to the inside of the fuel rail for partially transmitting and partially reflecting the pressure waves so that wave amplitude is decreased. An alternative embodiment comprises an acoustical barrier in the fuel line having a cylindrical section with a diameter larger than that of the fuel line. Baffles, possibly annular rings, within the cylindrical section also serve to damp the pressure waves. The acoustical barrier may also be composed of a conical section with diameters equal to that of the cylindrical section on one end and the fuel line at the other end. Acoustical barriers placed in both the fuel line and the fuel rail also effectively damp the pressure waves.

14 Claims, 3 Drawing Sheets

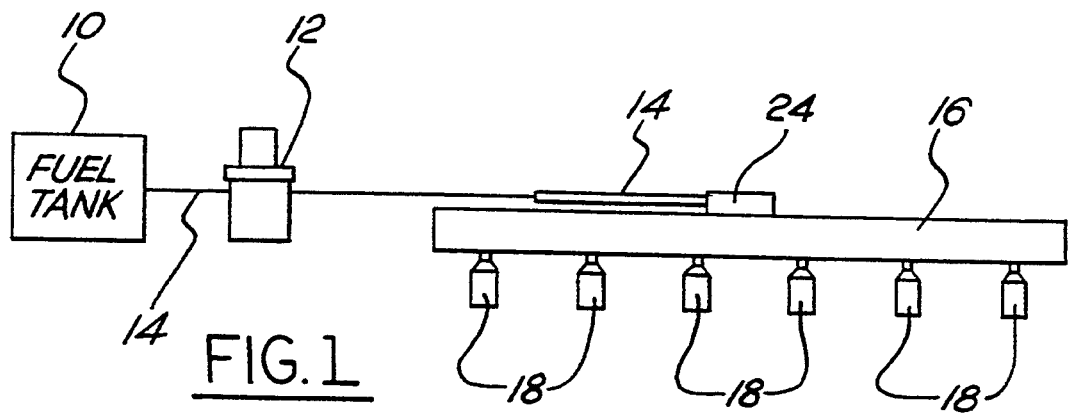
FIG. 1
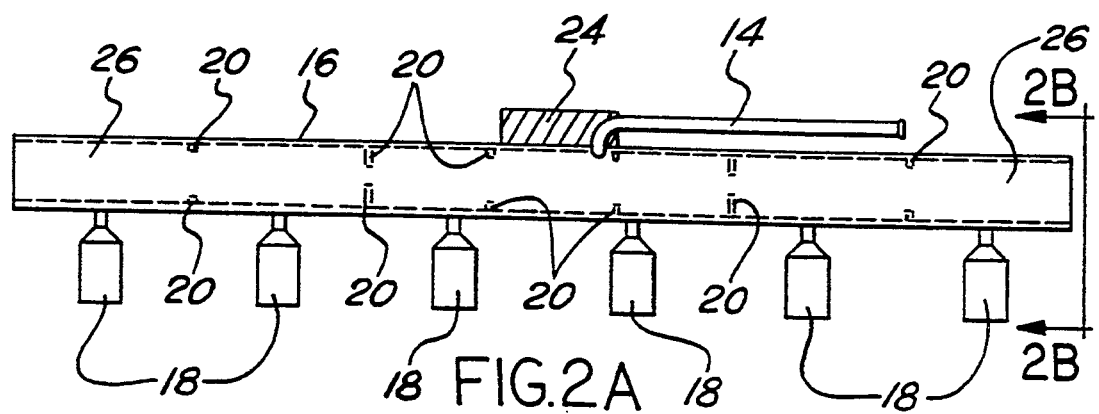
FIG. 2A
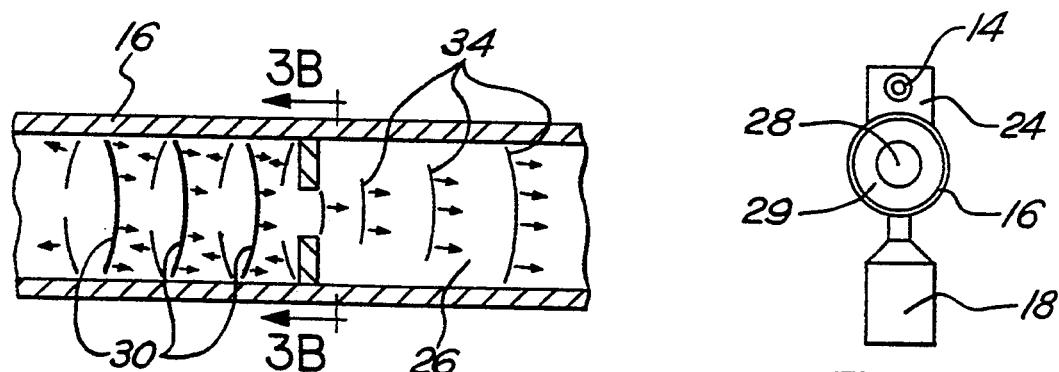
FIG. 3A
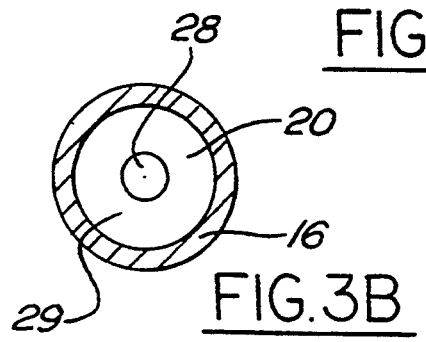
FIG. 2B
FIG. 3B

ACOUSTICAL DAMPING DEVICE FOR GASEOUS FUELED AUTOMOTIVE ENGINES

FIELD OF THE INVENTION

This invention relates to gaseous fueled automotive engines, and more particularly to an apparatus for reducing pressure waves within the fuel supply line and fuel rail of such engines.

BACKGROUND OF THE INVENTION

Gaseous fueled automobile engines, that is, those to which fuel is metered to the engine in the gaseous form as opposed to the conventional liquid form, have been investigated for production purposes for several reasons. First, fuels for gaseous fueled engines, for instance natural gas consisting primarily of methane, has a much higher domestic production rate than petroleum. Thus, domestic dependence on foreign oil supplies would be reduced as gaseous fueled engines proliferate. Second, natural gas is a renewable energy source. For example, a landfill can continuously produce methane as new waste is decomposed. Third, the price of natural gas is typically less than petroleum on an equivalent energy basis. Fourth, natural gas generally burns cleaner than liquid hydrocarbon fuels reducing significantly the carbon deposits prevalent with such liquid fuels. As a result, less maintenance is required. Fifth, natural gas has a higher octane rating which can provide better performance and economy. Sixth, natural gas is a more stable fuel, from both a chemical standpoint and since its ignition temperature is higher than petroleum. Natural gas also dissipates quicker and, should it leak from the automobile, it would rise since it is lighter than air thus making it less a hazard for accidental ignition than liquid fuels.

For the aforementioned reasons, gaseous fueled engines are an attractive alternative to liquid petroleum operated engines. Fuel for a gaseous fueled engine is typically stored in a canister at high pressure, for example 300–3000 pounds per square inch (psi), and fed to the engine through a fuel line. A pressure regulator reduces the stored pressure to a pressure satisfactory for metering into the engine, typically in the range of 100 psi. One problem with such an arrangement for gaseous fueled engines is the production of a pressure wave within the fuel rail and the fuel supply line during fuel metering to the engine cylinders. This pressure wave, which has an amplitude of approximately 3 to 5 psi above and below existing fuel rail pressure, is caused by the successive opening and closing of fuel metering devices to the cylinders. The pressure wave potentially causes uneven fuel metering from the fuel injectors to the cylinders since the amount of fuel forced to the cylinders varies with rail pressure. Undesirable results of uneven fuel metering are a rough idle, loss of fuel economy, poorer exhaust emissions, and, in severe cases, deteriorated drivability. This uneven fuel metering results partially from the pressure wave travelling, at the speed of sound through the fuel, to the pressure regulator. The pressure regulator attempts to compensate for the pressure variation and, if the rarefaction wave frequency corresponds to the pressure regulator's natural frequency, extreme pressure fluctuations result.

For any engine load, the fuel metering devices will request a corresponding air-fuel ratio. When the pressure wave passes unsuppressed through the fuel rail, the actual air-fuel ratio delivered to the engine varies from that requested due to gaseous pressure differentials. The primary objective of the fuel metering system is to provide an actual air-fuel ratio that corresponds as closely as possible to that requested, typically by the engine on-board computer. Obviously, any fluctuations in rail pressure which occur faster than the rail pressure sensor and computer can respond will cause uneven fuel metering.

SUMMARY OF THE INVENTION

The present invention provides a means for inhibiting the pressure waves within a gaseous fueled engine's fuel rail to improve fuel metering consistency. Acoustical tuning of the gaseous fuel supply manifold, i.e. the fuel rail, is accomplished by positioning wave damping devices within the fuel line or fuel rail. These wave damping devices break up the pressure waves by partially transmitting and partially reflecting them. When the wave confronts a damping device, a portion is reflected and a portion is transmitted, thus reducing its amplitude. Since pressure waves travel at the speed of sound within the fuel, many wave break-ups occur before the next fuel metering device is active, effectively reducing pressure waves.

The present invention provides a fuel supply system for a gaseous fueled automotive engine comprising a fuel tank for containing gaseous fuel, a fuel line connecting said fuel tank and the engine, a fuel pressure regulator connected between the fuel tank and the engine by the fuel line such that pressure from the fuel tank is reduced to a predetermined amount for supply to the engine, and means for damping pressure waves in the fuel line or fuel rail by partially reflecting and partially transmitting the pressure waves such that a nearly constant pressure is maintained in the fuel rail and so that gaseous fuel is evenly metered to combustion cylinders in the engine.

In a preferred embodiment, the means for damping pressure waves comprises a plurality of acoustical barriers, such as annular rings, secured to an inner diameter of the fuel rail connected between the fuel line and the engine, with the plurality of rings alternately positioned between a plurality of fuel supply valves or injectors openable to the engine's combustion cylinders, the plurality of rings having apertures aligned so that gaseous fuel flows in an approximately perpendicular direction through the apertures such that said pressure waves are partially reflected from and partially transmitted through the apertures within the fuel rail such that a nearly constant pressure is maintained in the fuel line and so that the gaseous fuel is evenly metered to combustion cylinders in the engine.

Geometric configurations other than annular rings for the wave damping devices are possible depending on the shape of the fuel line. For instance, the fuel line could be square or rectangular and the damping devices would also be square or rectangular. The apertures inside those damping devices could be circular, square, rectangular or any number of other shapes so long as the pressure waves are partially reflected and partially transmitted. A mesh shape also effectively damps the pressure waves. There may be one aperture for allowing transmission of the pressures waves in a damping device or there may be several. For example, there may be three circular holes within a solid ring.

The optimal design for the damping device is fifty percent (50%) of the fuel line cross-sectional area for reflecting the pressure waves and fifty percent (50%) for transmitting.

In an alternative embodiment, which can function alone or with the aforementioned embodiment, the means for damping comprises an acoustical barrier placed in the fuel line before the fuel rail. The acoustical barrier has a cylindrical section with a diameter greater than that of the fuel line, the acoustical barrier having at least one baffle, the at least one baffle partially reflecting and partially transmitting the pressure waves. The acoustical barrier may also have a conically shaped section having a first end and a second end, with the first end connected to a portion of the fuel line in fluid communication with the engine and having a diameter equal to that of the fuel line, the second end being in fluid communication with the fuel tank and having a diameter greater than that of the fuel line.

BRIEF DESCRIPTION OF THE DRAWINGS

FIG. 1 is a schematic of a fuel supply system for a gaseous fueled engine.

FIG. 2A is a cross-sectional side view of a fuel rail for a gaseous fueled engine showing wave damping devices for reducing pressure waves.

FIG. 2B is an end view of FIG. 2A along section 2B—2B.

FIG. 3A is a cut-away view of a wave damping device of the present invention within a fuel rail schematically showing pressure wave reflection and transmission within the gaseous fuel.

FIG. 3B is a cross-sectional view of a wave damping device of the present invention taken across line 3B—3B of FIG. 3A.

DETAILED DESCRIPTION OF THE PREFERRED EMBODIMENT

Figure 4:
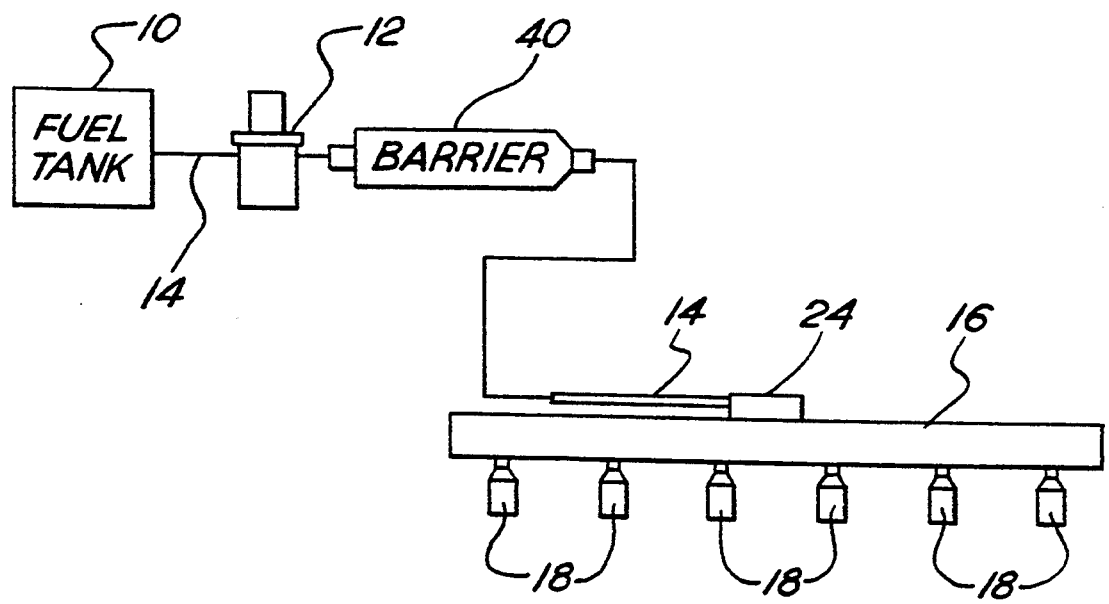
FIG. 4 is a schematic of a fuel supply system for a gaseous engine showing an acoustical barrier according to another aspect of the present invention for damping pressure waves.

Referring now to FIG. 1, a schematic of the fuel supply system for a gaseous engine is shown. The gaseous fuel, such as natural gas, is stored in a fuel tank 10, which typically is a high pressure canister made of steel or aluminum or a composite with the gas being stored at a pressure usually in the range of 300 psi to 3000 psi. The fuel is routed to pressure regulator 12 by fuel line 14 where its pressure is reduced to that required for metering into the engine. Typical fuel pressure is in the 80 psi to 110 psi range. After its pressure is reduced, the fuel is routed by fuel line 14 to fuel rail 16 which in turn leads to individual fuel metering devices 18. The fuel metering devices 18 can be, for instance, fuel injectors.

Fuel rail 16 is shown in cut-away form in FIG. 2A. Fuel line 14, which attaches to fuel rail 16 by retaining block 24, delivers pressurized gaseous fuel to internal space 26. As fuel is required for combustion, fuel metering devices 18 open allowing fuel to flow into the engine (not shown). As shown in FIG. 3A, a pressure wave 30 can be set up in the fuel within internal space 26 as the fuel metering devices 18 open or shut. The pressure wave 30 can also travel through fuel line 14 to pressure regulator 12. If the pressure wave 30 is not damped in some way, ill effects on the fuel delivery system result, such as uneven fuel metering or pressure regulator 12 hystersis. Wave damping devices 20 within fuel rail 16 break up such pressure waves. The wave damping devices 20, preferably acoustical barriers such as annular rings secured to the inside diameter of fuel rail 16, are positioned between fuel metering devices. An acoustical barrier is a device placed in the path of a pressure wave which partially reflects the pressure wave. Attachment to the fuel rail 16 is preferably by welding or press-fitting and the devices 20 are preferably made of a material compatible with fuel rail 16, such as stainless steel. The rings may be cast-in or molded into the rail. As few as one damping device 20 sufficiently breaks up pressure waves 30 to improve fuel metering. Preferably, however, several damping devices 20 positioned as shown in FIG. 2A more effectively break up the pressure waves. The wave damping devices 20 define an orifice 28, as shown in FIGS. 2B and 3B, for partial transmission of the pressure wave 30. Annular ring 29 partially reflects the pressure wave 30. Testing has shown that the optimal size for orifice 28 is one-half of the inner diameter of fuel rail 16.

FIG. 3A shows the mechanism for damping pressure waves of the preferred embodiment of the present invention. An original pressure wave 30 travels toward the wave dampening device 20 from the left end of the fuel rail 16 in FIG. 3A. Upon encountering the wave damping device 20, pressure wave 30 is broken into a reflected wave 32 and a transmitted wave 34. The resulting wave components have reduced power according to the following acoustical equations:

$$\text{Power}_{Transmitted\ Wave} = (\text{Area}_{orifice}/\text{Area}_{total}) * \text{Power}_{Origin}$$

$$\text{Power}_{Reflected\ Wave} = (1 - \text{Area}_{orifice}/\text{Area}_{total}) * \text{Power}_{Origin}$$

where $\text{Area}_{orifice}$ = The area of the orifice 28;

$\text{Area}_{total}$ = The flow cross-sectional area of fuel rail 16; and $\text{Power}_{Origin}$ = The power of the incident original pressure wave 30. The original pressure wave 30 from a fuel metering device 18 typically confronts a wave damping device 20 before reaching or affecting another fuel metering device 18 in the fuel rail 16. Since pressure waves travel at the speed of sound within the fuel, many subsequent wave break-ups of the component waves occur before the next fuel metering device 18 is active, effectively reducing pressure waves within the fuel. Additionally, reflected and transmitted waves from successive wave damping devices 20 travelling in opposite directions will also serve to damp the pressure wave energy within fuel rail 16 when they meet.

Figure 5:
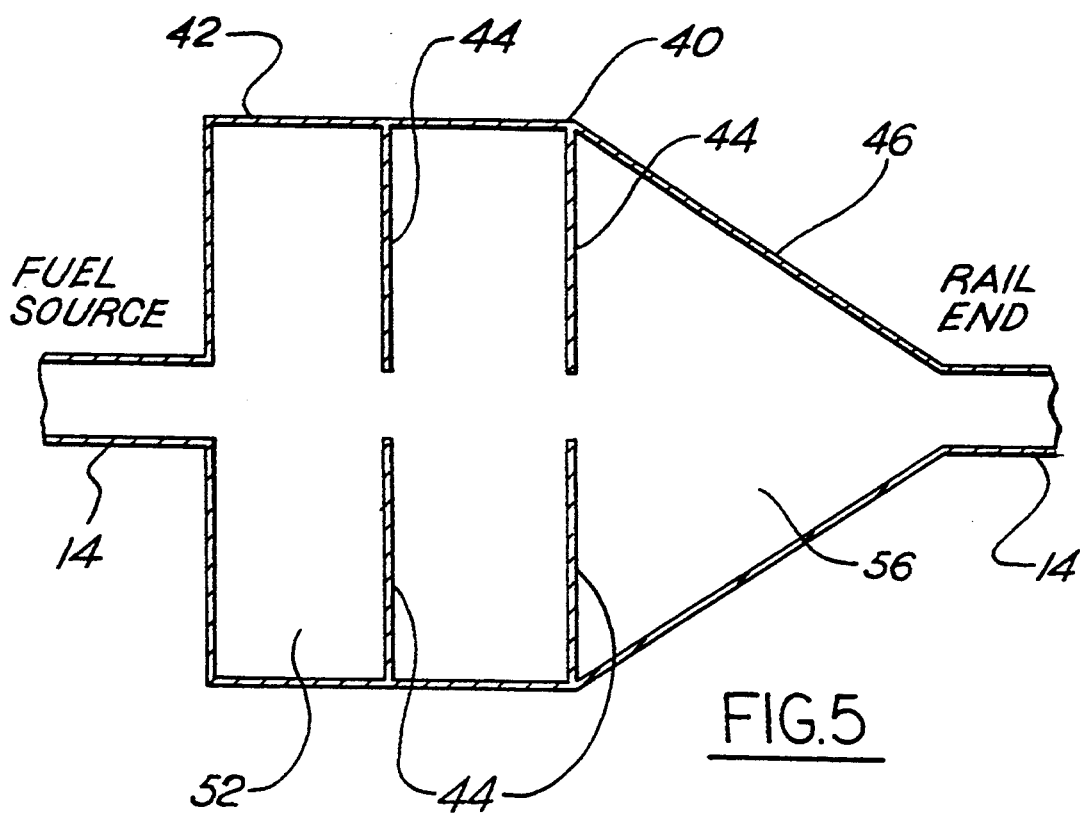
FIG. 5 is a schematic view of the acoustical barrier of FIG. 4.

A schematic of a gaseous fuel supply system of an alternative embodiment of the present invention is shown in FIG. 4. In the alternative embodiment, the pressure waves are allowed to travel through fuel rail 16 to fuel line 14 before confronting an acoustical barrier 40 which acts to damp the pressure waves. FIG. 5 is a cross-sectional view of the acoustical barrier 40. Fuel line 14 connects to a cylindrical section 42 which has a diameter larger than that of fuel line 14. Baffles 44 within cylindrical section 42 serve to break up the pressure waves. The acoustical barrier is preferably integrally formed as shown in FIG. 5. Conical section 46 connects to the cylindrical section 42 on one end and to the fuel line 14 on the other. The acoustical barrier may also comprise only the cylindrical section 42 or only the conical section 46 as either alone will break up and dampen the pressure waves.

Figure 6A:
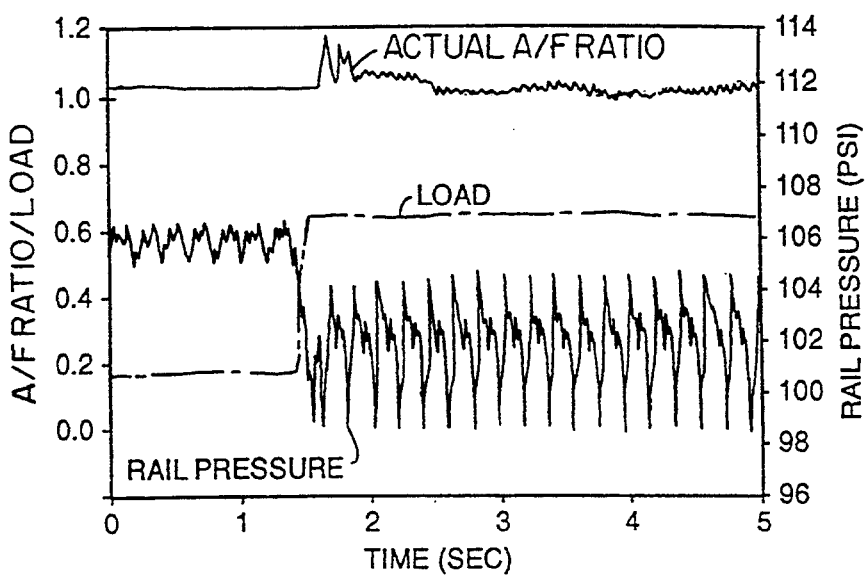
FIG. 6A is a graph showing the effects of pressure waves on fuel rail pressure and air-fuel ratio for a gaseous fuel supply system without wave damping devices.
Figure 6B:
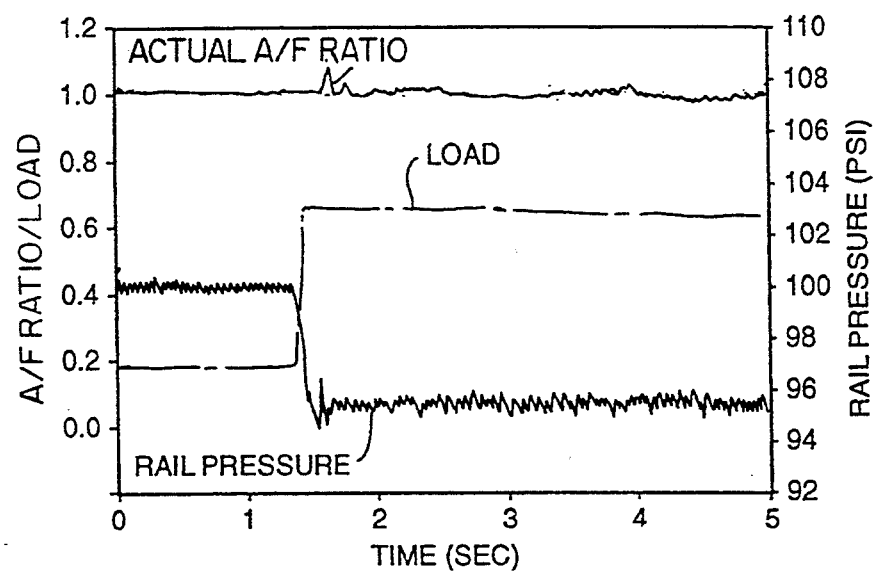
FIG. 6B is a graph showing the effects of pressure waves on fuel rail pressure and air-fuel ratio for a gaseous fuel supply system with wave damping devices of the preferred embodiment of the present invention.
Figure 6C:
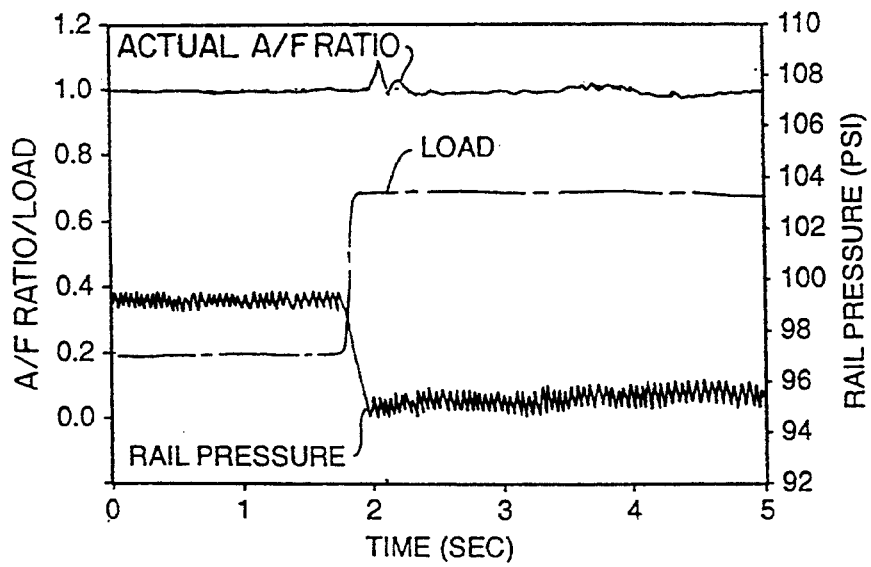
FIG. 6C is a graph showing the effects of pressure waves on fuel rail pressure and air-fuel ratio for a gaseous fuel supply system with an acoustical barrier according to an alternative embodiment of the present invention.

Tests conducted with and without the wave dampening devices of the present invention show the effectiveness of acoustical tuning to minimize the effect of pressure waves on fuel metering within a gaseous fueled engine. FIGS. 6A through 6C graphically show several parameters of a gaseous fueled engine before, during and after a load change for fuel supply system without wave dampening devices (plain rail), with the preferred wave dampening devices of the present invention (annular rings), and with an alternative embodiment of the present invention (acoustical barrier), respectively. The following parameters are depicted:

LOAD: The fraction of the engine's theoretical maximum torque.

ACTUAL AIR-FUEL RATIO: Air-fuel ratio of the engine's cylinders divided by the stoichiometric air-fuel ratio of the fuel.

RAIL PRESSURE: Pressure of the fuel in the fuel rail.

Deviations of the actual air-fuel from the optimal value for air-fuel ratio, that is 1.0, are obviously evident in FIG. 6A for the plain rail. These deviations are evidenced as a high-frequency roughness in the trace. In addition, the rail pressure in FIG. 6A shows significant pressure waves, particularly after the load change. FIG. 6B shows that the actual air-fuel ratio for the annular ringed rail is significantly closer to the optimal value, 1.0, than that shown in FIG. 6A for the plain rail. As described above, the pressure waves are significantly reduced resulting in improved fuel metering. Results for the acoustical barrier show that the actual air-fuel ratio more closely follows the optimal air-fuel ratio than for the plain rail. In addition, although the frequency of the perturbations is higher in the acoustical isolator version than in the plain rail version, the amplitude is much lower.

Although the preferred embodiments of the present invention has been disclosed, various changes and modifications may be made without departing from the scope of the invention as set forth in the appended claims.

We claim:

1. A fuel supply system for a gaseous fueled automotive engine comprising:
   a fuel tank for containing fuel for said engine;
   means for conveying said gaseous fuel to said engine; and
   means for damping pressure waves occurring within gas flowing in said conveying means, said means for damping comprising at least one acoustical barrier secured to an inner portion of a fuel rail of said means for conveying, wherein said fuel rail defines a cross-section across which said gaseous fuel flows, said fuel rail being in fluid communication with said engine at a first end and with said means for conveying at a second end, with said at least one acoustical barrier defining a separate aperture aligned so that said gaseous fuel flows in a perpendicular direction which is normal to the plane of said acoustical barrier and said aperture, with said at least one acoustical barrier and said aperture aligned such that said pressure waves are partially reflected and partially transmitted within said fuel rail.

2. A fuel supply system according to claim 1 wherein said aperture has a cross-sectional area which is one-half of said cross-sectional area of said fuel rail.

3. A fuel supply system according to claim 2 wherein said at least one acoustical barrier is positioned between a plurality of fuel outlets from said fuel rail, with said plurality of fuel outlets being in fluid communication with a plurality of combustion chambers in said engine, and with said outlets having valves between said fuel rail and said chambers, said valves controllably openable and closeable to allow gaseous fuel to flow to said chambers.

4. A fuel supply system according to claim 3 wherein a means for regulating pressure within said means for conveying is placed between said tank and said engine, said means for regulating in fluid communication with said means for conveying.

5. A fuel supply system according to claim 1 wherein said means for damping is an acoustical barrier having a housing, an inlet in fluid communication with said tank through said means for conveying, and an outlet in fluid communication with said engine through said means for conveying, said housing having affixed therein at least one baffle, said at least one baffle partially transmitting and partially reflecting said wave perturbations.

6. A fuel supply system according to claim 5 wherein said housing has a cylindrical section with a diameter greater than that of said means for conveying such that said pressure waves expand upon passing through an opening leading from said engine through said means for conveying.

7. A fuel supply system according to claim 6 wherein said housing has a conically shaped section having a first end and a second end, said first end connected to a portion of said fuel line in fluid communication with said engine and said first end having a diameter equal to that of said fuel line, said second end in fluid communication with said fuel tank and having a diameter greater than that of said fuel line.

8. A fuel supply system according to claim 1 wherein said means for damping comprises:
   at least one acoustical barrier secured to an inner portion of a fuel rail of said means for conveying, wherein said fuel rail defines a cross-section across which said gaseous fuel flows, said fuel rail being in fluid communication with said engine at a first end and with said means for conveying at a second end, with said at least one acoustical barrier defining a separate aperture aligned so that said gaseous fuel flows in a perpendicular direction which is normal to the plane of said acoustical barrier and said aperture, with said at least one acoustical barrier and said aperture aligned such that said pressure waves are partially reflected and partially transmitted within said fuel rail; and an acoustical barrier having a housing, an inlet in fluid communication with said tank through said means for conveying, and an outlet in fluid communication with said engine through said means for conveying, said housing having affixed therein at least one baffle, said at least one baffle partially transmitting and partially reflecting said wave perturbations.

9. A fuel supply system for a gaseous fueled automotive engine comprising:

a fuel tank for containing gaseous fuel for said engine;

a fuel line connecting said fuel tank and said engine;

a fuel pressure regulator connected between said fuel tank and said engine by said fuel line such that pressure from said fuel tank is reduced to a predetermined amount for supply to said engine; and means for damping pressure waves in said fuel line by partially reflecting and partially transmitting said pressure waves such that a nearly constant pressure is maintained in said fuel rail and such that said gaseous fuel is evenly metered to combustion cylinders in said engine, said means for damping comprising a plurality of rings secured to an inner diameter of a fuel rail connected between said fuel line and said engine, said plurality of rings alternately positioned between a plurality of fuel supply valves openable to said combustion cylinders within said engine, said plurality of rings having apertures aligned so that said gaseous fuel flows in an approximately perpendicular direction which is normal to the plane of said plurality of rings, said plurality of rings and said apertures aligned such that said pressure waves are partially reflected and partially transmitted through said apertures within said fuel rail.

10. A fuel supply system according to claim 9 wherein said apertures have a diameter of one-half the diameter of said plurality of rings.

11. A fuel supply system according to claim 9 wherein said means for damping comprises an acoustical barrier having a cylindrical section with a diameter greater than that of said fuel line.

12. A fuel supply system according to claim 11 wherein said acoustical barrier has at least one baffle, said at least one baffle partially reflecting and partially transmitting said pressure waves.

13. A fuel supply system according to claim 12 wherein said acoustical barrier has a conically shaped section having a first end and a second end, said first end connected to a portion of said fuel line in fluid communication with said engine and said first end having a diameter equal to that of said fuel line, said second end in fluid communication with said fuel tank and having a diameter greater than that of said fuel line.

14. A fuel supply system according to claim 9 wherein said means for damping comprises:

a plurality of rings secured to an inner diameter of a fuel rail connected between said fuel line and said engine, said plurality of rings alternately positioned between a plurality of fuel supply valves openable to said combustion cylinders within said engine, said plurality of rings having apertures aligned so that said gaseous fuel flows in an approximately perpendicular direction which is normal to the plane of said plurality of rings, said plurality of rings and said apertures aligned such that said pressure waves are partially reflected and partially transmitted through said apertures within said fuel rail; and an acoustical barrier in fluid communication with said fuel line, said acoustical barrier having a cylindrical section with a diameter greater than that of said fuel line.

* * * * *